United States Patent
Geltinger et al.

(10) Patent No.: US 9,050,744 B2
(45) Date of Patent: *Jun. 9, 2015

(54) APPARATUS AND METHOD FOR SHAPING PLASTICS MATERIAL PREFORMS

(75) Inventors: Florian Geltinger, Donaustauf (DE); Juergen Soellner, Beratzhausen (DE); Yasin Kerim, Koenigsbrunn (DE)

(73) Assignee: KRONES, AG, Neutraubling (DE)

( * ) Notice: Subject to any disclaimer, the term of this patent is extended or adjusted under 35 U.S.C. 154(b) by 253 days.

This patent is subject to a terminal disclaimer.

(21) Appl. No.: 13/530,607

(22) Filed: Jun. 22, 2012

(65) Prior Publication Data

US 2012/0326358 A1 Dec. 27, 2012

(30) Foreign Application Priority Data

Jun. 24, 2011 (DE) .......................... 10 2011 105 744

(51) Int. Cl.
*B29C 49/12* (2006.01)
*B29C 49/42* (2006.01)
*B29C 49/46* (2006.01)
*B29C 49/06* (2006.01)
*B29C 49/36* (2006.01)

(52) U.S. Cl.
CPC ................. *B29C 49/12* (2013.01); *B29C 49/42* (2013.01); *B29C 49/46* (2013.01); *B29C 2049/4697* (2013.01); *B29C 49/06* (2013.01); *B29C 49/36* (2013.01)

(58) Field of Classification Search
CPC ....................................................... B29C 49/42
See application file for complete search history.

(56) References Cited

U.S. PATENT DOCUMENTS

| | | | |
|---|---|---|---|
| 3,712,784 A | 1/1973 | Siard et al. | |
| 8,435,024 B2 | 5/2013 | Dordoni | |
| 8,708,680 B2 * | 4/2014 | Geltinger et al. ................. | 425/3 |
| 2010/0301523 A1 | 12/2010 | Gillet et al. | |

(Continued)

FOREIGN PATENT DOCUMENTS

| | | |
|---|---|---|
| DE | 102008056346 | 5/2010 |
| WO | 2010020529 | 2/2010 |

(Continued)

OTHER PUBLICATIONS

German Search Report issued on Feb. 7, 2012 in corresponding German Patent Application 10 2011 105 744.0.

(Continued)

*Primary Examiner* — Alison Hindenlang
(74) *Attorney, Agent, or Firm* — Onello & Mello, LLP.

(57) ABSTRACT

At least one blow-molding station is arranged on a conveying device. The blow-molding station includes a blow-mold that forms a cavity into which plastics material pre-forms are expanded by a gaseous medium, supplied by a stressing device. A clean room at least partially surrounds the blow-molding station. A stretching unit stretches the plastics material pre-forms along their longitudinal direction with a stretch bar that is insertable into the plastics material pre-forms. The stretching unit includes a drive device for moving the stretch bar. The blow molding station includes a receiving space with at least one wall for receiving the stretch bar. In operation, the drive device is positioned outside the receiving space at least part of the time. A gaseous medium at a pressure higher than ambient pressure in a non-sterile environment of the receiving space is supplied to the receiving space.

15 Claims, 4 Drawing Sheets

(56) References Cited

U.S. PATENT DOCUMENTS

| | | |
|---|---|---|
| 2011/0133369 A1 | 6/2011 | Martini et al. |
| 2011/0241265 A1 | 10/2011 | Schmidt |
| 2011/0272861 A1 | 11/2011 | Humele |
| 2012/0164258 A1 | 6/2012 | Dordoni |

FOREIGN PATENT DOCUMENTS

| | | |
|---|---|---|
| WO | 2010057325 | 5/2010 |
| WO | 2011030183 | 3/2011 |

OTHER PUBLICATIONS

Chinese Office Action dated Jun. 23, 2014, issued in Chinese Application No. 201210201751.0.

Extended European Search Report issued on Sep. 4, 2014 in corresponding European Patent Application 12173180.6.

* cited by examiner

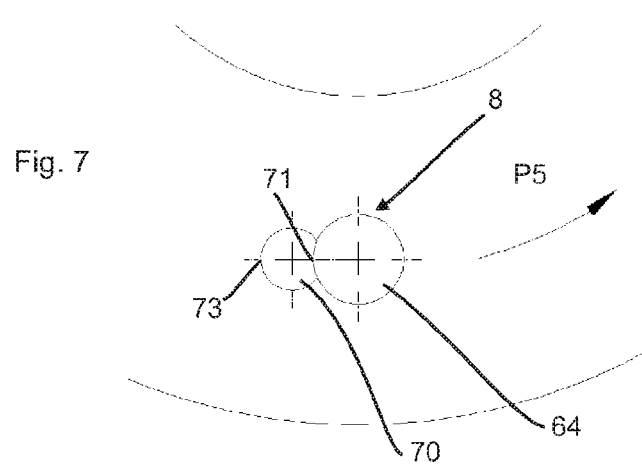
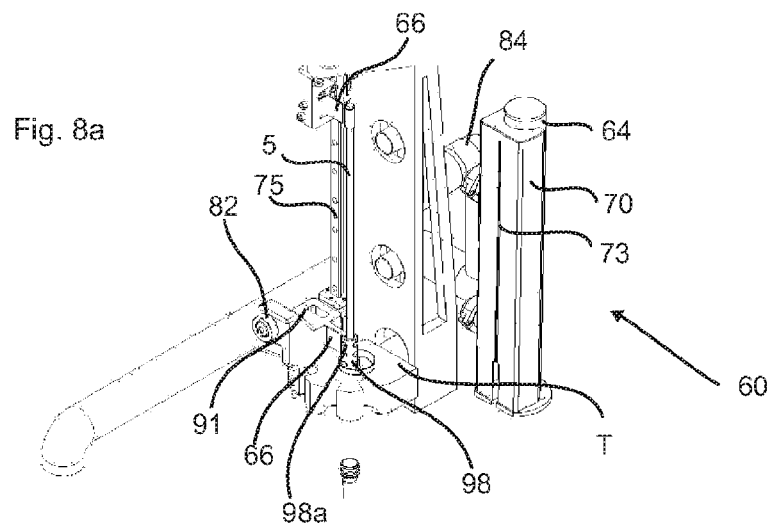
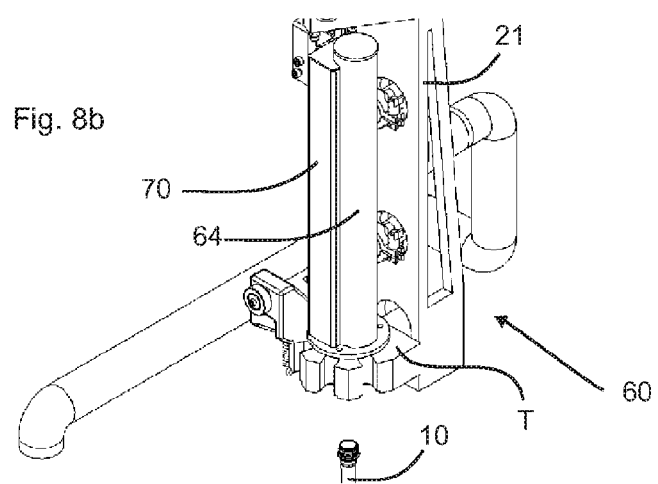

APPARATUS AND METHOD FOR SHAPING PLASTICS MATERIAL PREFORMS

RELATED APPLICATIONS

This application claims priority to German Patent Application No. 10 2011 105 744.0, filed on Jun. 24, 2011, in the German Patent and Trademark Office, the content of which is incorporated herein by reference in its entirety.

BACKGROUND

Exemplary embodiments in accordance with principles of inventive concepts relate to an apparatus and a method of shaping plastics material pre-forms into plastics material containers. An apparatus employed in such shaping may be referred to as a stretch-blow-moulding machine. Typically, stretch blow moulding machines have a plurality of blow-moulding stations in which pre-forms are blow-moulded into plastic bottles by the application of an internal pressure. Finished blow-moulded plastics must be cleaned in a complicated manner after completion of the blow-moulding process.

During the blow-moulding process a stretch bar moves into the plastics material pre-form and stretches it to the base of the mould. Blow moulding pressure shapes the bottle and the stretch bar retracts from the finished bottle. A stretching unit supports and guides the stretch bar.

Typically, a stretching unit may be connected and guided on a linear guide by way of a moment slide or stretch slide. The stretch bar is generally guided centrally in a very precise manner over a very long stroke (up to 450 mm, for example). The stretch slide moves in and out at very high speed and may be driven, for example, by a linear motor mounted centrally with respect to the stretching axis.

Alternatively, the stretch bars may be moved by a guide cam, for example.

Conventionally, a stretch blow-moulding machine is located in a non-clean room and is subject to contamination. As a result, the ready shaped bottle may be contaminated and may require hygienic cleaning in a separate module, such as a rinser.

PCT application WO 2010/020529 A2, which is hereby incorporated by reference in its entirety, discusses a sterile blow moulding machine.

At present, no stretch blow moulding machines are known which produce plastic bottles which are blown aseptically. The mechanical system and the "non-clean course" of the stretching process are similar in all machines currently on the market.

SUMMARY

The object of exemplary embodiments in accordance with principles of inventive concepts is to provide a stretch blow moulding machine which has a hygienically designed stretching unit.

This object is attained in accordance with principles of inventive concepts as described in the following claims.

An apparatus in accordance with principles of inventive concepts for the shaping of plastics material pre-forms into plastics material containers has at least one blow moulding station which is arranged on a movable conveying device, the blow moulding station having a blow mould and this blow mould forming a cavity in the interior of which the plastics material pre-forms are capable of being expanded by being acted upon with a gaseous medium to form the plastics material containers. In addition, the apparatus has a stressing device which acts upon the plastics material pre-forms with a gaseous medium in order to expand them. A clean room, surrounds the blow moulding station at least in part. A stretching unit stretches the plastics material pre-forms along their longitudinal direction. In an exemplary embodiment in accordance with principles of inventive concepts, the stretching unit has a stretch bar which is movable with respect to the plastics material preforms and which is capable of being inserted into the plastics material pre-forms. The stretching unit additionally has a drive device for moving the stretch bar along the longitudinal direction thereof.

In accordance with principles of inventive concepts the blow moulding station has a receiving space with at least one wall for receiving the stretch bar. The stretch bar is movable with respect to this receiving space, with a drive device advantageously being arranged outside this receiving space, at least for a time. The receiving space is capable of receiving a gaseous medium at a pre-set pressure P above an ambient pressure in a non-sterile environment of this receiving space. It is advantageous for a sterile medium and, in particular sterile air, to be present in the receiving space.

In accordance with principles of inventive concepts, the drive device for moving the stretch bar may include, for example, a linear motor, an electric motor, a mechanical drive, or a hydraulic drive.

The drive of the stretch bar may also be implemented by a cam roller and a corresponding guide cam arranged in a stationary manner, for example. The guide cam can be arranged in an exemplary embodiment in accordance with principles of inventive concepts outside the clean room for example. The conveying device which conveys the blow moulding station, or the blow mould, may be, for example a rotatable blow moulding wheel on which a plurality of blow moulding stations of this type are arranged. It is also advantageous for a stressing device to be arranged inside the clean room and advantageously opposite the containers to be expanded.

In a further advantageous embodiment, the stretch bar may be arranged on a holding device that extends through a wall of the receiving space. In an exemplary embodiment in accordance with principles of inventive concepts, the stretch bar may be connected by the holding device to the drive device (for example, a slide element or the like). In an exemplary embodiment in accordance with principles of inventive concepts, the stretch bar may be separated from a contaminated surrounding area in a way that prevents it from coming into contact with any germs or other contamination.

An easy accessibility in the cyclical cleaning of the hygienic units is nevertheless made possible by embodiments in accordance with principles of inventive concepts. An apparatus and method in accordance with principles of inventive concepts allow plastics material pre-forms to be deformed in a hygienic manner.

In a further advantageous embodiment in accordance with principles of inventive concepts, the entire holding device extends through an opening formed in the wall of the receiving space. This opening can be designed in the form of a slot for example in accordance with principles of inventive concepts. In this way, it is possible for the receiving space to surround the stretch bar over its entire periphery with the exception of the aforesaid slot. In an exemplary embodiment, the receiving space may be cylindrically-shaped, with the aforesaid slot for example. In addition, it would be possible for a sealing device to be provided which in each case seals off the slot in those regions in which the holding device is not present. This can be a sliding seal which in each case seals off those regions in which the aforesaid holding device is not present or provided respectively.

In a further advantageous exemplary embodiment, the apparatus may include a transition space which is separated from the environment by means of at least one wall, the transition space being connected, in terms of flow, to the receiving space mentioned above. In this way, it is possible for the stretch bar to extend in the receiving space or a chamber which is acted upon with sterile air. The gas pressure in the receiving space is higher in an exemplary embodiment in accordance with principles of inventive concepts than the air pressure of the non-sterile environment. The higher sterile pressure in the receiving space may be from an atmosphere which is also used to supply the blow moulds situated thereunder with sterile air, for example.

A second chamber, the transition space mentioned above, can be attached to the aforesaid chamber or the receiving space. A lower pressure may be present in this transition space than in the receiving space and the non-sterile ambient air. These two chambers, that is, the receiving space and the transition space, may be connected, in an exemplary embodiment in accordance with principles of inventive concepts, to a common slot which is continuous on one side and through which the sterile air can flow from the receiving space to the transition space. In addition, the transition space advantageously may include a further slot which leads in an open manner to the atmosphere.

The two aforesaid slots and the under-pressure in the transition space create a gaseous flow in the direction of the transition space. A constant movement of air from the receiving space to the transition space prevents contamination of the stretch bar. Additionally constantly moving air from the non-clean atmosphere to the transition space prevents the escape of contaminated air, which may be enriched with hydrogen peroxide, into the atmosphere. An arrangement of this type may also be referred to herein as an extraction organ.

In an exemplary embodiment, an extraction organ maintains the pressure in the transition space advantageously lower than in the environment and in the receiving space, so that the lowest pressure, as a whole, is present in the aforesaid transition space.

It is advantageous for the two slots or openings, respectively of the receiving space and of the transition space, also to be arranged in such a way that they are opposite the direction of movement of the blow-moulding stations, so that the direct introduction of germs into the receiving space is prevented.

In an exemplary embodiment of further advantage a wall may be arranged between the receiving space and the transition space.

As mentioned above, the stretch bar can be held by way of a holding device, also referred to herein as a "stretching sword," that extends inside the receiving space. The stretching sword can be driven by a linear motor and advantageously projects through the two slots mentioned above and, in a particularly advantageous manner, may be mounted so as to be displaceable in the horizontal plane. In an exemplary embodiment such as this, the stretch bar extends only in the sterile zone and thus remains aseptically clean.

It is advantageous for the blow moulding slide also to be designed in a corresponding manner to this stretching sword. The blow moulding nozzle, which is likewise placed on the plastics material pre-forms in order to expand them, can be arranged on this blow moulding slide. The blow moulding slide is preferably conveyed below the stretch bar, advantageously on the same linear guide. A corresponding stretching sword of the blow moulding slide likewise advantageously extends through the receiving space and, in a particularly advantageous embodiment, also through the transition space.

In an exemplary embodiment in accordance with principles of inventive concepts, a stretching sword of the blow moulding slide may be guided by two openings, which may take the form of slots, as described above. In the sterile environment of the receiving space the blow moulding slide may be connected to the blow moulding piston and move inside the extraction organ like the above-mentioned stretching sword. The blow moulding piston may be advantageously raised by the aforesaid blow moulding slide or a cam mounted in a stationary manner, for example. In an exemplary embodiment of further advantage, the receiving space is changed in terms of flow with the clean room. In addition, it is preferable for an extraction device to be provided in order to draw a gaseous medium out of the transition space. In an exemplary embodiment in accordance with principles of inventive concepts this extraction device can advantageously convey the gaseous medium into the (non-sterile) environment. The extraction device may include a valve device in an exemplary embodiment in accordance with principles of inventive concepts.

In an exemplary embodiment of further advantage, the stretch bar may be arranged in an eccentric manner with respect to the receiving space. In such an exemplary embodiment, it is advantageously provided that the receiving space has a specific minimum volume in order to ensure this sterility. The stretch bar is advantageously guided in an eccentric manner with respect to the receiving space, in order to be able to arrange the stretch bar comparatively close to the opening of the receiving space.

In an exemplary embodiment of advantage, the receiving space may be substantially cylindrical in shape. In such an embodiment, the stretch bar may be guided inside this cylinder, and may be advantageously arranged in an eccentric manner with respect to the centre of the cylindrical receiving space.

In an exemplary embodiment of advantage, the stressing device is arranged at least in part in the receiving space; both the stretch bar and the stressing device may be arranged in the receiving space.

Exemplary embodiments in accordance with principles of inventive concepts further relate to a method of shaping plastics material pre-forms into plastics material containers. In exemplary embodiments, the plastics material pre-forms are conveyed with at least one blow moulding station, which is arranged on a movable conveying device, through a clean room and are acted upon with a gaseous medium (such as air, for example) at least for a time during this conveying in order to expand the pre-forms. In addition, the plastics material pre-forms may be stretched by means of a stretch bar in their longitudinal direction. The stretch bar may be moved with respect to the plastics material pre-forms in the longitudinal direction.

In accordance with principles of inventive concepts the stretch bar may be moved inside a receiving space that is bounded off from a non-sterile environment, for example, by at least one wall. In addition, the receiving space may be acted upon with a gaseous medium and the pressure of this gaseous medium inside the receiving space is higher than the ambient pressure in a non-sterile environment, also referred to herein as a positive pressure environment. It is advantageous for the plastics material pre-forms to be acted upon with sterile air.

In an exemplary method a holding device, on which the stretch bar is arranged and which preferably extends through an opening in the receiving space, is moved with respect to the receiving space in order to move the stretch bar with respect to the plastics material pre-form. It is advantageous in an exemplary embodiment for the receiving space to be arranged fixed with respect to the conveying device and advantageously also fixed with respect to the individual blow moulding stations in the longitudinal direction of the plastics material pre-forms. It is advantageous in an exemplary embodiment in accordance with principles of inventive concepts for the stretch bar to be arranged fixed with respect to the aforesaid holding device.

In an exemplary embodiment, an apparatus for the shaping of plastics material pre-forms into plastics material containers includes a blow-moulding station arranged on a movable conveying device, wherein the blow moulding station includes a blow-mould that forms a cavity in the interior of which plastics material pre-forms are capable of being expanded by being acted upon with a gaseous medium to form the plastics material containers; a stressing device configured to act upon the plastics material pre-forms with the gaseous medium in order to expand them; a clean room which surrounds the blow moulding station at least in part; a stretching unit configured to stretch the plastics material pre-forms along their longitudinal direction, wherein the stretching unit includes a stretch bar which is movable with respect to the plastics material pre-forms and which is insertable into the plastics material pre-forms, and a drive device for moving the stretch bar along the longitudinal direction thereof, wherein the blow moulding station includes a receiving space with a wall for receiving the stretch bar and/or the stressing device, and the stretch bar is movable with respect to this receiving space, and the drive device is arranged to remain outside the receiving space, at least for a time during operation of the apparatus; and wherein the receiving space includes a non-sterile environment and configured to receive a gaseous medium at a pressure P1 above ambient pressure Pu.

In an exemplary embodiment an apparatus includes a stretch bar arranged on a holding device that extends through a wall of the receiving space.

In an exemplary embodiment an apparatus includes a transition space separated from the external environment by a wall, wherein the transition space is connected, in terms of flow, to the receiving space.

In an exemplary embodiment an apparatus includes a wall between the receiving space and the transition space.

In an exemplary embodiment an apparatus includes a holding device that extends through the transition space.

In an exemplary embodiment an apparatus includes a receiving space connected, in terms of flow, to the clean room.

In an exemplary embodiment an apparatus includes an extraction device configured to draw a gaseous medium out of the transition space.

In an exemplary embodiment an apparatus includes a stretch bar positioned in an eccentric manner with respect to the receiving space.

In an exemplary embodiment an apparatus includes a stressing device positioned, at least in part, in the receiving space.

In an exemplary embodiment a method of shaping plastics material pre-forms into plastics material containers, includes conveying plastics material pre-forms with a blow-moulding station arranged on a movable conveying device through a clean room; expanding plastics material pre-forms with a gaseous medium at least for a time during the conveying; a stretch bar stretching the plastics material pre-forms in their longitudinal direction, wherein the stretch bar is moved with respect to the plastics material pre-forms in the longitudinal direction of the stretch bar and the stretch bar is moved inside a receiving space bounded off from a non-sterile environment by at least one wall; and supplying a gaseous medium to the receiving space at a pressure higher than ambient pressure in the non-sterile environment.

In an exemplary embodiment a method includes a holding device, on which the stretch bar is arranged and which extends through an opening in the receiving space, moved with respect to the receiving space in order to move the stretch bar with respect to the plastics material pre-form.

In an exemplary embodiment a method includes separating a transition space from an external environment by a wall, wherein the transition space is connected in terms of flow to the receiving space.

In an exemplary embodiment a method includes extending the holding device through the transition space.

In an exemplary embodiment a method includes connecting, in terms of flow, the receiving space to the clean room.

In an exemplary embodiment a method includes drawing a gaseous medium out of the transition space with an extraction device.

In an exemplary embodiment a method includes positioning the stretch bar in an eccentric manner with respect to the receiving space.

In an exemplary embodiment a method includes positioning the stressing device, at least in part, in the receiving space.

BRIEF DESCRIPTION OF THE DRAWINGS

The drawings are not necessarily to scale, emphasis instead being placed upon illustrating the principles of inventive concepts. Further advantages and embodiments are evident from the accompanying drawings. In the drawings

FIG. 7 is a diagrammatic illustration of an exemplary embodiment of a stretching unit in accordance with principles of inventive concepts;

FIGS. 8a, 8b are perspective illustrations of an exemplary embodiment of a stretching unit in accordance with principles of inventive concepts.

DETAILED DESCRIPTION

Figure 1:
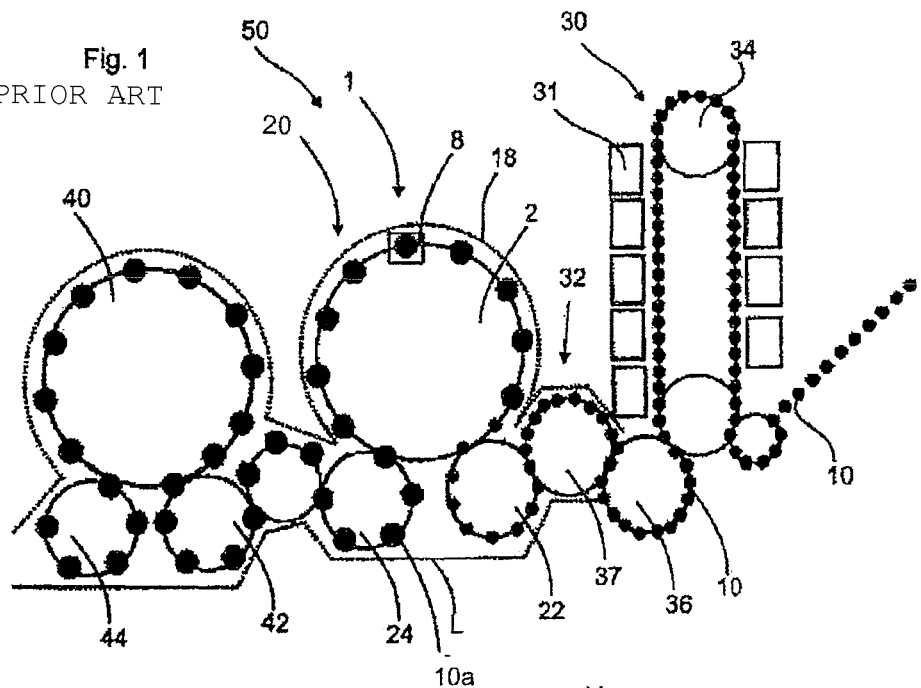
FIG. 1 is a diagrammatic illustration of an exemplary embodiment of a plant for producing plastics material containers in accordance with principles of inventive concepts.

Exemplary embodiments in accordance with principles of inventive concepts will now be described more fully with reference to the accompanying drawings, in which exemplary embodiments are shown. Exemplary embodiments in accordance with principles of inventive concepts may, however, be embodied in many different forms and should not be construed as being limited to the embodiments set forth herein; rather, these embodiments are provided so that this disclosure will be thorough and complete, and will fully convey the concept of exemplary embodiments to those of ordinary skill in the art. In the drawings, the thicknesses of layers and regions may be exaggerated for clarity. Like reference numerals in the drawings denote like elements, and thus their description may not be repeated.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of exemplary embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Exemplary embodiments in accordance with principles of inventive concepts are described herein with reference to cross-sectional illustrations that are schematic illustrations of idealized embodiments (and intermediate structures) of exemplary embodiments. As such, variations from the shapes of the illustrations as a result, for example, of manufacturing techniques and/or tolerances, are to be expected. Thus, exemplary embodiments in accordance with principles of inventive concepts should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of exemplary embodiments.

Unless otherwise defined, all terms (including technical and scientific terms) used herein have the same meaning as commonly understood by one of ordinary skill in the art to which exemplary embodiments in accordance with principles of inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a diagrammatic illustration of a conventional plant for producing plastics material containers. The plant 50 includes a heating device 30 in which plastics material pre-forms 10 are heated. The plastics material pre-forms 10 are conveyed through heating device 30 by means of a conveying device 34, such as a circulating chain, for example. The plastics material pre-forms 10 are heated in by a plurality of heating elements 31. Heating device 30 has attached to it a transfer unit 36 which transfers the pre-forms 10 to a sterilization device 32. Sterilization device 32 likewise includes a conveying wheel 37, and sterilization elements can be arranged on conveying wheel 37, for example. Sterilization may be carried out by hydrogen peroxide gas or electromagnetic radiation, for example, in this region. In particular, the sterilization of internal surface(s) of the pre-forms is carried out in this region.

The reference number 20 designates a clean room, the external boundaries of which are indicated here by the dotted line L. In a further embodiment the clean room 20 is not only arranged in the region of the conveying wheel 2 and the filling device 40, but it extends, if possible, into the region of the heating device 30, the region of the sterilization device 32, and the region that supplies the plastics material pre-forms and/or produces the plastics material pre-forms. The clean room 20 extends, at least, into the region of the sterilization unit 32. Separating-out devices can be provided in this region in order to introduce the plastics material pre-forms into the clean room 20 without allowing excessive amounts of gas to flow inside the clean room and thereby being lost.

As indicated by broken line L, the clean room may be adapted to the external shape of the individual components of the plant. In this way the volume of the clean room may be minimized.

Reference number 1 designates a shaping apparatus, as a whole, in which a plurality of blow-moulding, or shaping, stations 8 are arranged on a conveying wheel 2. Only one blow moulding station 8 is shown here. Plastics material pre-forms 10 are expanded by these blow moulding stations 8 to form containers 10a. Although not shown in detail here, part of the conveying device 2 may extend beyond the clean room 20, with the clean room 20 or isolator configured in the form of a mini isolator inside the apparatus as a whole. In this way the clean room may be configured as a duct, or ducted enclosure, at least in the region of the shaping apparatus 1.

Reference number 22 relates to a supply device that transfers pre-forms to the shaping device 1. Reference number 24 relates to a removal device which removes the plastics material containers 10a from the shaping apparatus 1. In the region of the supply device 22 and the removal device 24, the clean room 20 includes recesses that receive the supply device 22 and removal device 24. In this way, a transfer of the plastics material pre-forms 10 to the shaping apparatus 1 or a transfer of the plastics material containers 10a from the shaping apparatus 1 can be carried out in a particularly advantageous manner.

Expanded plastics material containers 10a are transferred to a filling device 40 by a transfer unit 42 and they are then removed from this filling device 40 by way of a further conveying unit 44. In an exemplary embodiment in accordance with principles of inventive concepts filling device 40 is also situated inside clean room 20. A portion of filling device 40 may also extend beyond the clean room 20, with, for example, a reservoir for a beverage used to fill containers 10a located outside clean room 20, with only those areas in which the containers 10a are actually guided contained within the clean room 20, for example. In this respect, it would also be possible for the filling device to be designed in a similar manner to the apparatus 1 for shaping plastics material pre-forms 10.

As mentioned, the clean room 20 may be reduced in the region of the apparatus 1 to a relatively compact area, for example, essentially to the blow moulding stations 8 themselves. As a result of this compact design of the clean room 20 it is possible in an easier and more rapid manner to produce a clean room generally and, in addition, a lower outlay is required in order to keep the system sterile in the operative phase. A more compact clean room requires a lower volume of sterile air, and this allows for smaller filter units. The risk of uncontrolled swirl formation is also reduced with a more compact clean room 20.

Figure 2:
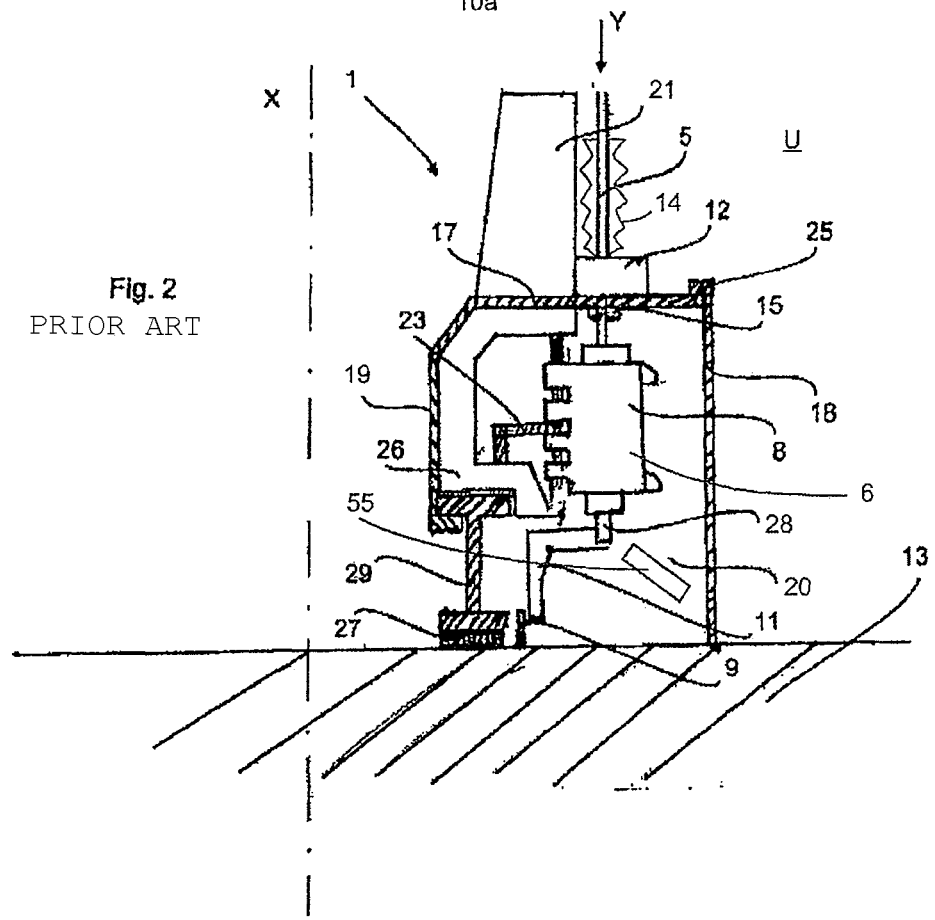
FIG. 2 is a view of an exemplary embodiment including a clean room in the region of a blow moulding station in accordance with principles of inventive concepts.

FIG. 2 is a detailed illustration of the apparatus 1 in the region of a blow moulding station 8. A plurality of blow-moulding stations 8 of this type are moved by a conveying device 2 or a carrier so as to rotate about an axis X. The blow moulding station 8 is guided inside the clean room 20 which is designed in the form of a duct. Clean room 20 is closed off by a movable lateral wall 19 and a cover 17 formed in one piece with this lateral wall 19. The lateral wall 19 and the cover 17 rotate jointly with the blow-moulding station 8.

Reference number 18 relates to another wall which bounds the clean room 20. Wall 18 is situated on the outside and is stationary. The cover 17 and the wall 18 have provided between them a sealing device 25 which seals off from each other the elements 17 and 18 movable with respect to each other, for example, as mentioned above, by using a surge chamber. The lower region of the wall 18 is arranged on a floor 13 in a fixed and sealed manner. A carrier 26, which likewise moves in a rotating manner and on which a holding device 23 which holds the blow moulding station 8 is in turn provided, is provided inside the clean room 20 abutting directly against the wall 19.

The reference number 11 relates to a follower device which can be actuated by a guide cam 9 in order to open and close the blow-moulding station on its path through the clean room 20, in order in particular to introduce the plastics material pre-form into the blow-moulding station and also to remove it again. A guide cam 9 is also arranged inside the clean room 20. It would also be possible, however, for a portion 11 below the individual blow-moulding stations 8 to extend outside of the clean room 20.

The conveying device 2 may include other elements, arranged above the clean room 20, for example.

The carrier 26 may be arranged in a fixed manner on a holding body 29 and this holding body, in turn, is movable with respect to the floor 13. The reference number 27 relates to a further sealing device which, in this area, also seals off the regions 13 and 29 which are movable with respect to each other.

The reference number 5 relates to a stretch bar which is movable with respect to the blow-moulding station in order to stretch the plastics material pre-forms 10 in their longitudinal direction. A slide 12 opposite which the stretch bar is movable in the direction Y is arranged on the cover 17. The reference number 21 relates to a further holding means for this slide 12 of the stretch bar 5.

Regions of the stretch bar are move outside the clean room 20 and inside the clean room 20 during the blow moulding procedure. For this reason a protective device, such as a folding bellows 14, may be provided outside the clean room 20 or above the slide 12, the folding bellows 14, surrounding the stretch bar 5 so that no region of the stretch bar 5 comes directly into contact with the outer environment. The reference letter U designates the (non-sterile) environment of the clean room 20. The reference number 28 designates a carrier for carrying a floor mould which likewise forms a component of the blow mould. The carrier is also movable in the direction Y.

The reference number 55 relates to a sterilization device which in may be arranged in the interior of the clean room 20 and is used for the sterilization of the individual shaping stations or components of the shaping stations 8. Sterilization device 55 can act in upon the shaping stations 8, for example, with hydrogen peroxide or another sterilization agent. Sterilization device 55 can be arranged so as to be stationary and the shaping stations can move with respect to sterilization device 55. This sterilization device 55 or application device can be situated on the conveying wheel 2 or on the vertical wall 18 or can be arranged so as to be generally stationary and can consist of nozzles or the like. In addition, it is advantageous for sterile air to be introduced into the clean room 20 in order to sterilize the clean room 20 by way of the aeration system.

Blow-moulds (not shown) are arranged inside blow-mould carriers 6. More precisely, two blow-mould carrier parts can be provided which are pivotable with respect to each other and which hold one blow-mould part in each case. The blow-moulds can be opened by this pivoting procedure for the introduction of plastics material pre-forms and for the removal of finished, blow-moulded containers. These blow-mould carriers and blow-moulds may also be arranged inside the clean room.

It would also be possible for the conveying device 2, or carrier, to have a C-shaped external periphery which also forms the outer walls of the clean room in part. In this way, this C-shaped clean room wall turns with the conveying device 2, i.e. the blowing wheel. In such an embodiment the lower boundary of the clean room is arranged at a distance from the floor 13 and moves relative to the floor. In this way, the clean room can be made even smaller than as shown in FIG. 2. In such an embodiment, the C-shaped profile of the conveying device, which forms both an inner wall and a lower and upper cover of the clean room, may be sealed off only with respect to the outer wall of the clean room. The outer wall may be arranged in a stationary manner.

Figure 3:
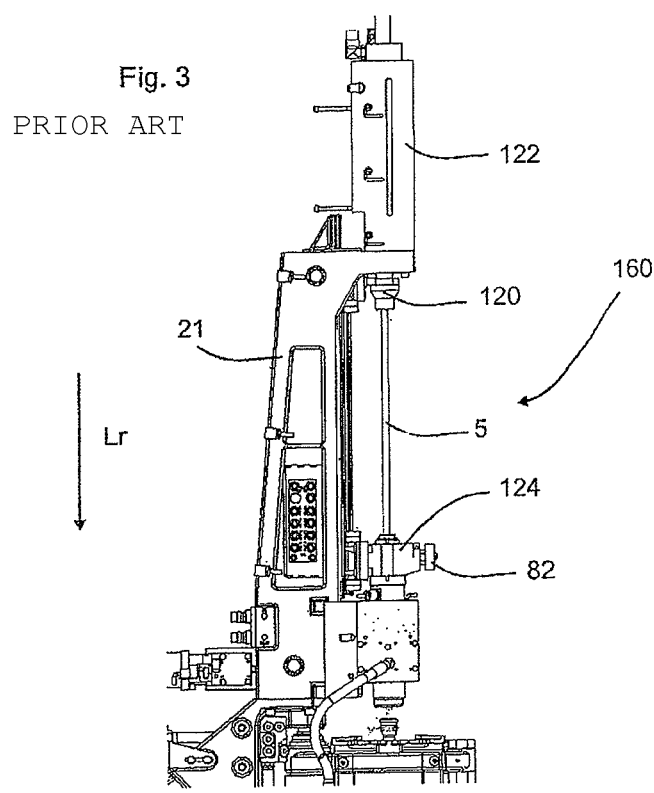
FIG. 3 is an illustration of a stretching unit in accordance with principles of inventive concepts.

FIG. 3 is a side view of a stretching unit 160 according to the internal prior art of the Applicants. Stretching unit 160 includes a carrier 21 on which a stretch slide 120 is arranged. A stretch bar 5 is, once more, guided with stretch slide 120. The reference number 124 designates a blow-moulding slide, that is, a slide which places a blow-moulding nozzle on the plastics material pre-forms. The reference number 82 designates a guide roller which can roll, for example, with respect to a guide cam in order to cause the movement of the blow-moulding slide. The reference number 122 designates a drive device, such as a linear motor, which drives the movement of the stretch bar. Instead of the linear motor, however, it would also be possible for a pneumatic or hydraulic drive, or a stretching cam, to be provided.

The reference Lr in the figures relates to the direction of movement of the stretch bar in order to stretch the plastics material pre-forms. This direction of movement corresponds to the direction of movement of the stretch slide 120 and advantageously also to the longitudinal direction of the plastics material pre-forms.

Figure 4:
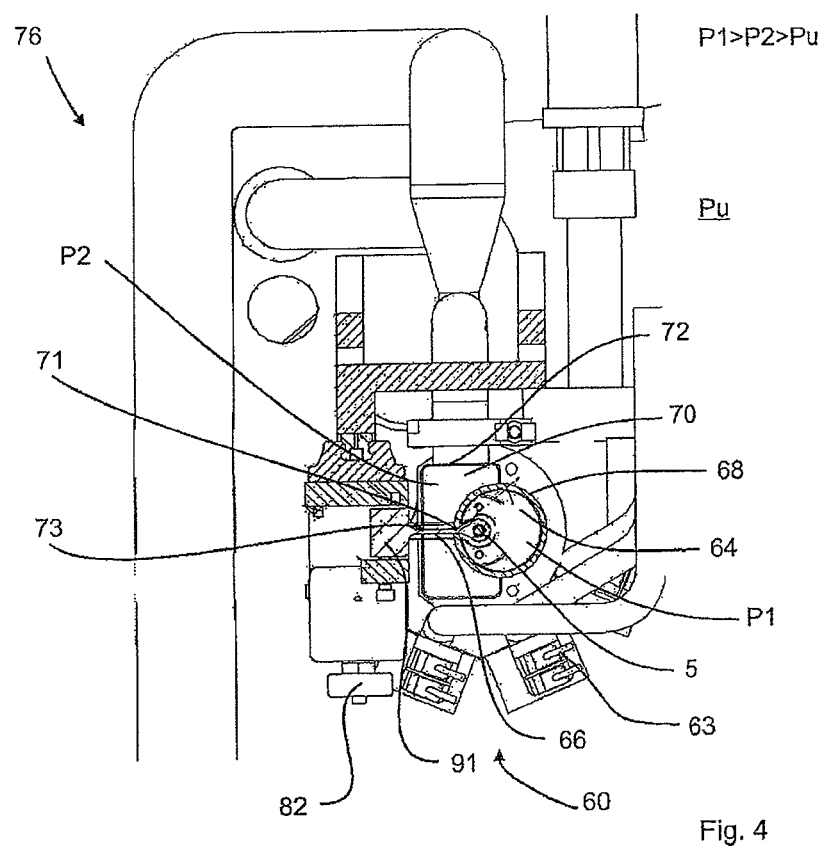
FIG. 4 is a plan view of a stretching unit in accordance with principles of inventive concepts.

FIG. 4 is a plan view of a stretching unit 60 in accordance with principles of inventive concepts. In an exemplary embodiment, the stretch bar 5 moves at a right angle to the plane of the figure in order to stretch the plastics material pre-forms (not shown). Stretch bar 5 moves inside a receiving space 64 which, in an exemplary embodiment in accordance with principles of inventive concepts, is cylindrical. In addition, receiving space 64 has an opening slot through which a holding device 66 or a sword holding the stretch bar 5 may be guided. A pressure P1, which is at least higher than a pressure Pu of the non-sterile environment outside, is present inside receiving space 64.

The reference number 70 designates a transition space through which the holding device 66 is likewise guided. In addition, transition space 70 is connected, in terms of gas-flow, to the receiving space 64. A pressure P2, which is lower than the pressure P1, is present in transition space 70, so that an air flow can pass into the transition space 70 solely from the receiving space 64. The reference number 72 designates a wall which bounds transition space 70. In a corresponding manner the reference number 68 designates a wall which bounds-off the receiving space 64. The gaseous medium can be removed out of the transition space 70 by way of a removal device 76 which is connected, in terms of flow, to transition space 70. This is particularly relevant to the sterilization processes.

The reference number 91 designates a stretch slide on which the holding device 66 and the stretch bar 5 are arranged in order to permit a movement in this manner. The reference number 82 designates a cam roller which is used for moving the blow moulding unit. The reference numbers 63 designate valve units for supplying the blowing air.

Figure 5:
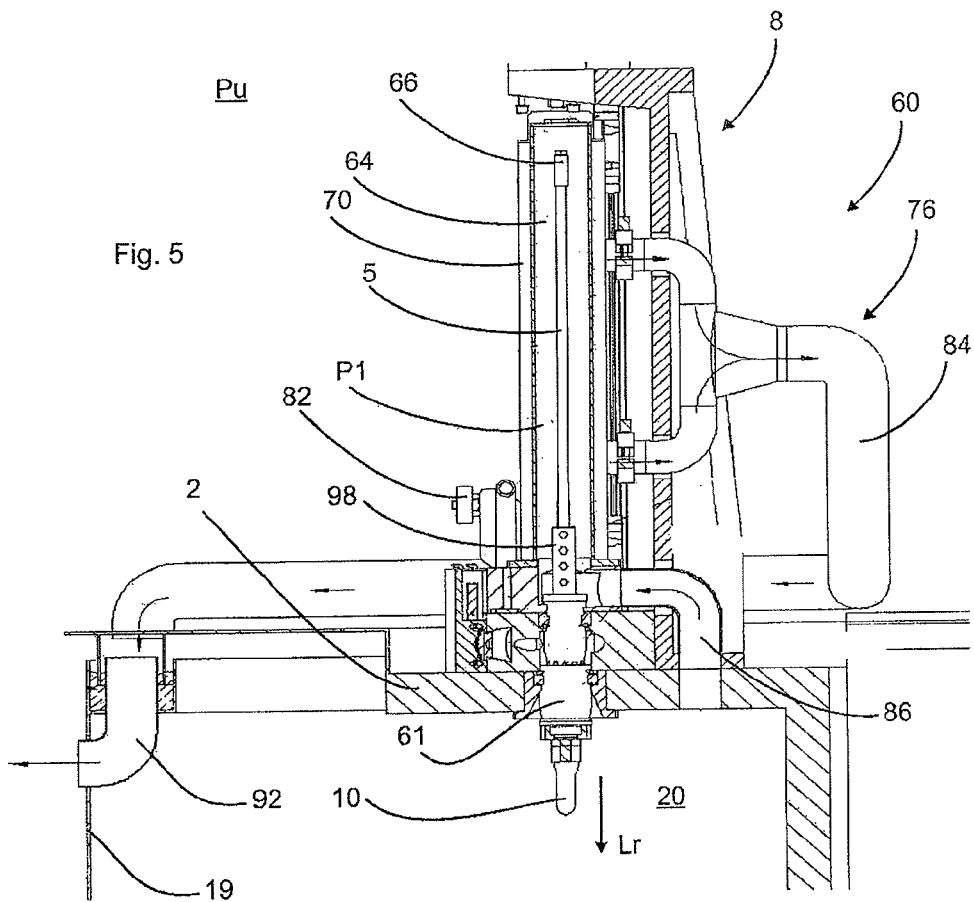
FIG. 5 is a side view of an exemplary embodiment of the stretching unit as shown in FIG. 4 in accordance with principles of inventive concepts.

FIG. 5 is a further illustration of the stretching unit 60, in which, in particular, the flow paths of air are illustrated. The air flowing into the receiving space 64 is derived from the atmosphere below the blow-moulding station 8. The bounding off from the environment is carried out by a standing cover. The sterile air rinses inside the receiving space 64, the entire stretch bar as well as the holding device 66, (not shown in FIG. 5) and also the corresponding sword of the blow moulding slide, which is attached to the body 98 at the rear. The reference number 61 designates the blow-moulding piston which is applied to the plastics material pre-forms 10. The reference number 20 designates a clean room. Here too the reference number 19 again designates a stationary seal. The reference number 2 designates the rotating blow-moulding wheel.

Air passes from the clean room 20 into the receiving space 64 by way of a connecting line 86. Contaminated air can be extracted through the attached extractor 76 by way of the two openings 71 and 73 (cf. FIG. 4). No non-sterile or contaminated air therefore passes into the system and, at the same time, no hydrogen peroxide passes out of the system into the environment during the sterilization process. The procedures described here take place, as mentioned above, in the rotating unit. The extraction can take place by way of a stationary unit. A so-called surge chamber can be provided as a sealing device for the connection between the stationary and the moving part. The reference number 84 relates to an extraction line which is a component of the extractor 76. Contaminated air is extracted out of the apparatus 1 for the removal line 92.

Figure 6:
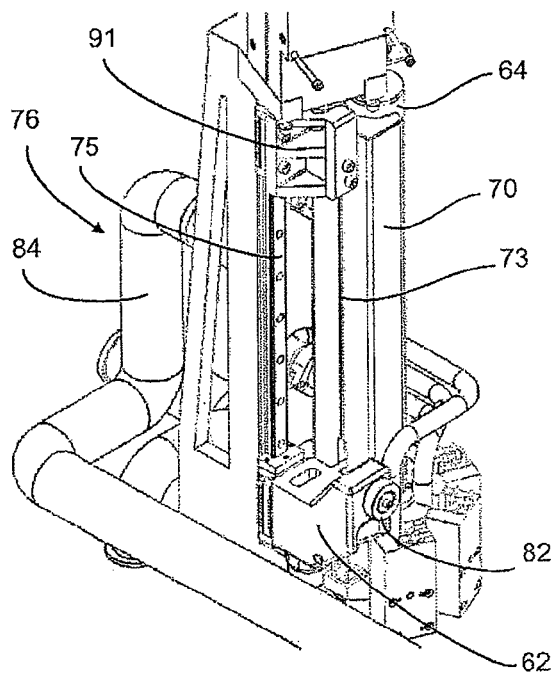
FIG. 6 is a perspective view of an exemplary embodiment of the stretching unit shown in FIG. 5 in accordance with principles of inventive concepts.

FIG. 6 is a perspective illustration of a stretching unit 60 in accordance with principles of inventive concepts. An exemplary embodiment in accordance with principles of inventive concepts includes receiving space 64 and the transition space 70. In addition, the removal device or the line 76, by way of which air can be extracted out of the transition space, is also included. Both the slide 91 for the movement of the stretch bar and the slide 62 for the movement of the blow moulding nozzle can be guided by the same carrier 75. In an exemplary embodiment in accordance with principles of inventive concepts the slide 62 may thus always be situated below the slide 91.

In the exemplary embodiment of FIG. 6 it will be seen that the carrier 75 and the opening 73 are orientated transversely to each other, that is, the slide 91 and the slide 62 are an angled part.

FIG. 7 is a roughly diagrammatic illustration of the apparatus in accordance with principles of inventive concepts. In an exemplary embodiment in accordance with principles of inventive concepts the arrow P5 designates the direction of movement of the individual blow-moulding stations 8.

In addition, the two slots or openings 71 and 73 of the receiving space 64 and of the transition space 70 are also included. These slots are directed contrary to the direction of movement in each case in the direction of movement P5.

FIGS. 8a and 8b are two illustrations of the stretching station, in which the receiving space 64 and the transition space 70 are shown separately from the stretch bar 5 in one illustration (cf. FIG. 8a) for purposes of explanation. In particular, the opening slot 73, with respect to which the holding device 66 is moved with the stretch bar 5, is shown in FIG. 8a.

The reference number 75 designates a carrier with respect to which the entire slide with the holding device 66 slides. The reference number 62 designates a slide for the blow-moulding unit which slides with respect to the carrier 75. The reference number 98 designates a guide member for the stretch bar 5 which has a plurality of openings 98a by way of which a sterilization agent can be introduced into the receiving space 64.

FIG. 8b is an illustration of the apparatus in accordance with principles of inventive concepts, illustrating receiving space 64 and the transition space 70.

The reference letter T designates the separation plane between the non-sterile and the sterile room in each case in the respective figures.

In an exemplary embodiment in accordance with principles of inventive concepts the atmosphere inside the receiving space 64 may be approximately 10 Pa higher than the ambient pressure. In an exemplary embodiment in accordance with principles of inventive concepts it is advantageous for this atmosphere inside the receiving space to be supplied with sterile air.

The pressure inside the transition space 70 may be, as mentioned above, below the pressure inside the receiving space and also advantageously below the ambient pressure. In an exemplary embodiment it is advantageous for the pressure inside the transition space to be approximately 5 pascals below the ambient pressure.

The individual drive devices for the stretch bar and/or the drive devices for the blow moulding nozzles and/or the lifting device of the blow moulding piston are advantageously situated outside the atmosphere or outside the receiving space 64 and, in a particularly advantageous manner, also outside the transition space.

In an exemplary embodiment in accordance with principles of inventive concepts, as illustrated in the figures the receiving spaces are bounded from one another in each case by chambers or walls.

As a result of the individual pressure ratios, a flow can take place from the receiving space 64 into the transition space 70 and a flow can also take place from the environment into the transition space 70. In addition, it is possible for there to be a connection between the receiving space 64 and the atmosphere situated under it, that is, in particular the clean room, which in an exemplary embodiment in accordance with principles of inventive concepts is likewise advantageously under an increased pressure of preferably approximately 10 Pa.

In addition, it is advantageously also possible for the stretch bar 5 to be capable of being adjusted in a horizontal plane by way of the holding device 66. In the case of a further advantageous embodiment it is also possible for the receiving space 64 or the extraction organ respectively to be capable of being removed, without the stretching unit itself or the stretch bar 5 respectively being removed for this purpose (cf. FIG. 8a). With reference to FIG. 7, for example, the individual slots or openings 71, 73 respectively may be orientated in a direction opposed to the operative direction of the process.

While exemplary embodiments in accordance with principles of inventive concepts have been shown, it will be understood that various changes in form and details may be made therein without departing from the spirit and scope of the following claims.

The invention claimed is:

1. An apparatus for the shaping of plastics material pre-forms into plastics material containers, comprising:
   a blow-moulding station arranged on a movable conveying device, wherein the blow moulding station includes a blow-mould that forms a cavity in the interior of which plastics material pre-forms are capable of being expanded by being acted upon with a gaseous medium to form the plastics material containers;
   a stressing device configured to act upon the plastics material pre-forms with the gaseous medium in order to expand them;
   a clean room which surrounds the blow moulding station at least in part;
   a stretching unit configured to stretch the plastics material pre-forms along their longitudinal direction, wherein the stretching unit includes:
      a stretch bar which is movable with respect to the plastics material pre-forms and which is insertable into the plastics material pre-forms; and
      a drive device for moving the stretch bar along the longitudinal direction thereof, wherein the blow moulding station includes a receiving space with a wall for receiving the stretch bar and/or the stressing device, and the stretch bar is movable with respect to this receiving space, and the drive device is arranged to remain outside the receiving space, at least for a time during operation of the apparatus, wherein the receiving space is configured to receive a gaseous medium at a pressure above ambient pressure of a non-sterile environment external to the receiving space, and wherein the apparatus includes a transition space separated from the non-sterile environment by a wall, wherein the transition space is connected, in terms of flow, to the receiving space.

2. An apparatus according to claim 1, wherein the stretch bar is arranged on a holding device that extends through a wall of the receiving space.

3. An apparatus according to claim 1, further comprising a wall between the receiving space and the transition space.

4. An apparatus according to claim 1, wherein the holding device extends through the transition space.

5. An apparatus according to claim 1, wherein the receiving space is connected, in terms of flow, to the clean room.

6. An apparatus according to claim 1, wherein the apparatus includes an extraction device configured to draw a gaseous medium out of the transition space.

7. An apparatus according to claim 1, wherein the stretch bar is positioned in an eccentric manner with respect to the receiving space.

8. An apparatus according to claim 1, wherein the stressing device is positioned, at least in part, in the receiving space.

9. An apparatus according to claim 1, wherein the receiving space is entirely sterile, and wherein the stretching bar is accommodated and movable within receiving space.

10. An apparatus according to claim 1, wherein the receiving space includes a sterile medium therein.

11. An apparatus according to claim 10, wherein the sterile medium includes sterile air.

12. An apparatus according to claim 1, wherein the stretch bar extends only in a sterile zone and remains aseptically clean in the sterile zone.

13. An apparatus according to claim 1, wherein the receiving space is different from a blowing piston and is different from a blowing nozzle.

14. An apparatus for the shaping of plastics material pre-forms into plastics material containers, comprising:
   a blow-moulding station arranged on a movable conveying device, wherein the blow moulding station includes a blow-mould that forms a cavity in the interior of which plastics material pre-forms are capable of being expanded by being acted upon with a gaseous medium to form the plastics material containers;
   a stressing device configured to act upon the plastics material pre-forms with the gaseous medium in order to expand them;
   a clean room which surrounds the blow moulding station at least in part;
   a stretching unit configured to stretch the plastics material pre-forms along their longitudinal direction, wherein the stretching unit includes:
      a stretch bar which is movable with respect to the plastics material pre-forms and which is insertable into the plastics material pre-forms; and
      a drive device for moving the stretch bar along the longitudinal direction thereof;
   wherein the blow moulding station includes a receiving space with a wall for receiving the stretch bar and/or the stressing device, and the stretch bar is movable with respect to this receiving space, and the drive device is arranged to remain outside the receiving space, at least for a time during operation of the apparatus, wherein the receiving space is configured to receive a gaseous medium at a pressure above ambient pressure of a non-sterile environment external to the receiving space, wherein the apparatus further comprises a blow moulding nozzle and a blow moulding piston that are arranged outside the receiving space, and wherein the receiving space is spaced apart from both the blow moulding nozzle and a blow moulding piston.

15. An apparatus for the shaping of plastics material pre-forms into plastics material containers, comprising:
   a blow-moulding station arranged on a movable conveying device, wherein the blow moulding station includes a blow-mould that forms a cavity in the interior of which plastics material pre-forms are capable of being expanded by being acted upon with a gaseous medium to form the plastics material containers;

a stressing device configured to act upon the plastics material pre-forms with the gaseous medium in order to expand them;

a clean room which surrounds the blow moulding station at least in part;

a stretching unit configured to stretch the plastics material pre-forms along their longitudinal direction, wherein the stretching unit includes:
- a stretch bar which is movable with respect to the plastics material pre-forms and which is insertable into the plastics material pre-forms; and
- a drive device for moving the stretch bar along the longitudinal direction thereof;

wherein the blow moulding station includes a receiving space with a wall for receiving the stretch bar and/or the stressing device, and the stretch bar is movable with respect to this receiving space, and the drive device is arranged to remain outside the receiving space, at least for a time during operation of the apparatus, wherein the receiving space is configured to receive a gaseous medium at a pressure above ambient pressure of a non-sterile environment external to the receiving space, and wherein the pressure inside the receiving space is 10 Pa or higher.

* * * * *